US007931202B2

(12) United States Patent
Galloway et al.

(10) Patent No.: US 7,931,202 B2
(45) Date of Patent: Apr. 26, 2011

(54) ELECTRONIC BUSINESS AND INFORMATION CARD

(76) Inventors: Richard Galloway, Des Moines, IA (US); Rick West, Kansas City, MO (US); Bill Galloway, Kansas City, MO (US)

( * ) Notice: Subject to any disclaimer, the term of this patent is extended or adjusted under 35 U.S.C. 154(b) by 463 days.

(21) Appl. No.: 12/206,245

(22) Filed: Sep. 8, 2008

(65) Prior Publication Data

US 2010/0059983 A1    Mar. 11, 2010

(51) Int. Cl.
*G06K 19/00*    (2006.01)
(52) U.S. Cl. ......................................... 235/487; 235/375
(58) Field of Classification Search ................... 235/487, 235/375, 380; 283/56, 75
See application file for complete search history.

(56) References Cited

U.S. PATENT DOCUMENTS

| | | |
|---|---|---|
| 3,691,312 A | 9/1972 | Petersen |
| 5,063,698 A | 11/1991 | Johnson et al. |
| 5,480,156 A | 1/1996 | Doederlein et al. |
| 5,493,105 A | 2/1996 | Desai |
| 5,588,678 A | 12/1996 | Young |
| 5,641,164 A | 6/1997 | Doederlein et al. |
| 5,836,616 A | 11/1998 | Cooper |
| 5,855,001 A | 12/1998 | Doederlein et al. |
| 5,938,199 A | 8/1999 | Doederlein et al. |
| 6,292,780 B1 | 9/2001 | Doederlein et al. |
| 6,845,583 B2 | 1/2005 | Lee |
| 7,292,681 B2 | 11/2007 | Pines |
| 7,434,735 B2 * | 10/2008 | Dean et al. ..................... 235/487 |
| 2006/0161439 A1 * | 7/2006 | Selg et al. ..................... 704/270 |
| 2007/0158403 A1 * | 7/2007 | Ertas ............................. 235/375 |

* cited by examiner

*Primary Examiner* — Ahshik Kim
(74) *Attorney, Agent, or Firm* — G. Brian Pingel; Camille L. Urban

(57) ABSTRACT

An electronic business and information card device having sound recording means and sound producing means operably connected to sound storing means, all disposed within a business-card sized housing. The device is battery powered and features three-button operation. Sound information may be pre-recorded. The device has a lockout means to prevent inadvertent erasure of pre-recorded information and to selectively permit recording of new sound information over previous sound information. The surfaces of the housing are provided with identifying information such as names, logos and contact information. Alternatively, the surfaces of the housing may be left blank for customization by intermediate- or end-users.

12 Claims, 4 Drawing Sheets

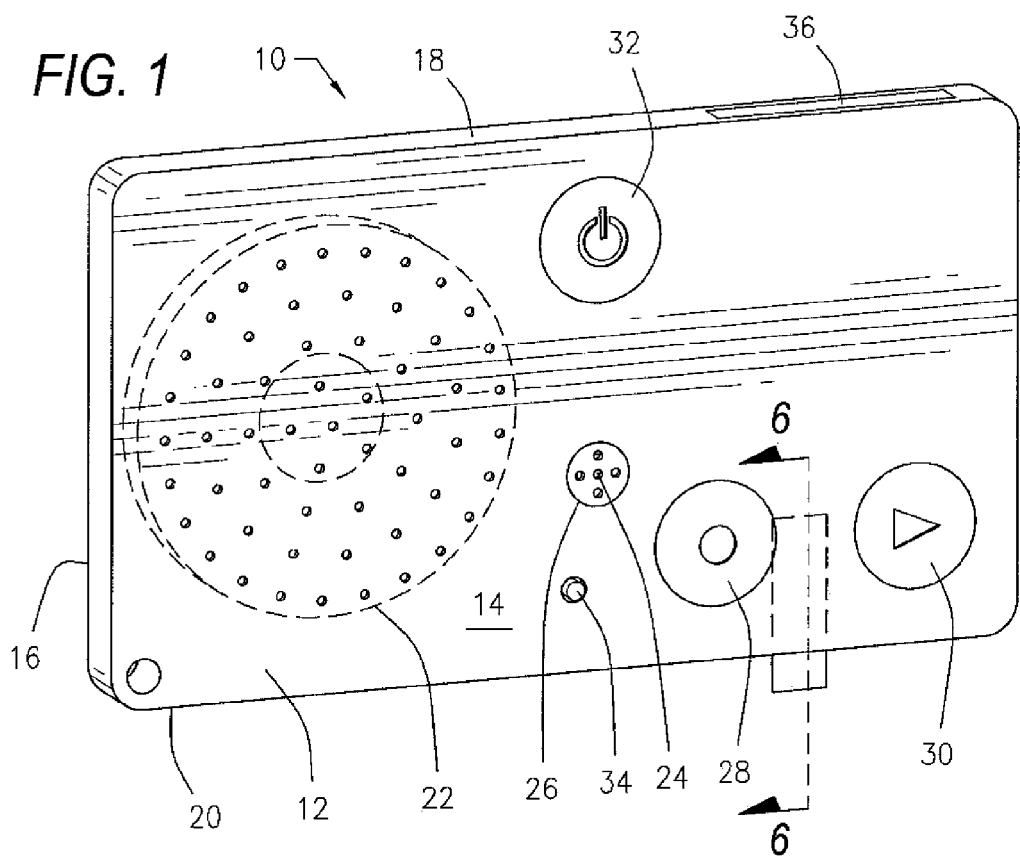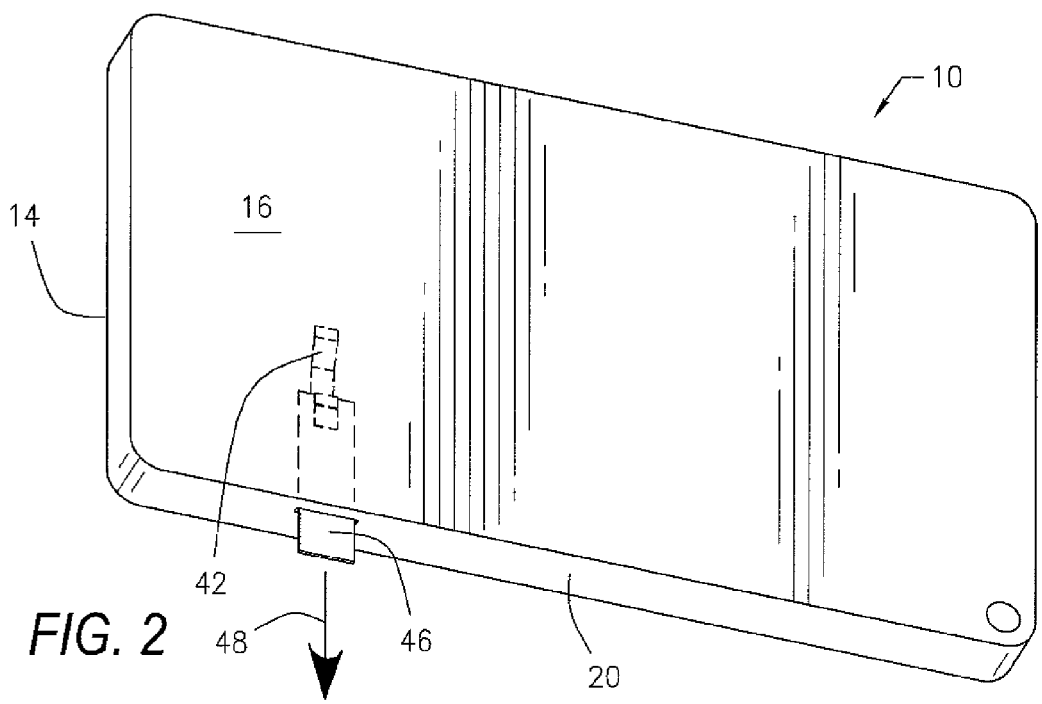

ELECTRONIC BUSINESS AND INFORMATION CARD

CROSS-REFERENCE TO RELATED APPLICATIONS

None

BACKGROUND OF THE INVENTION

1. Field of the Invention

The present invention is directed generally to intelligent business cards and small electronic devices for capturing and reproducing sound. More particularly, the invention is directed to an electronic device roughly the size of a conventional business card that permits the provider to pre-record sound-information for the user, and likewise permits the user to playback the pre-recorded sound information and selectively and repeatedly record, store and playback his or her own sound information.

2. Description of the Prior Art

Portable, digital sound recording devices are known in the art. It is likewise well known to provide business cards as a convenient source of ready identification and as a way for one's personal and or business identity to be recalled by a third party at a later date when the third party wishes to contact the provider for a business or other purpose. Business cards may also serve valuable marketing and advertising functions. Preferably, the mental impression upon receipt of a business card is positive and is recalled when the recipient of the card subsequently retrieves it.

A need exists for an improved business card that achieves all of the objectives of conventional business cards and related advertising or promotional materials, while simultaneously providing the recipient with the ability to hear pre-recorded sound information from the provider, and also permitting the recipient to record, save and playback his or her own sound information.

SUMMARY OF THE INVENTION

The present invention relates to a personal digital sound recorder that is approximately the size of a normal business card. The electronic business and information card of the present invention has a housing of suitable dimension, means for recording, storing and producing sound, means for controlling the same, a battery, and means for selectively delivering power from the battery to the device. The surfaces of the housing are provided with identifying information such as names, logos and contact information. Alternatively, the surfaces of the housing may be left blank for customization by intermediate- or end-users. An integrated circuit is provided, as is a lockout means to prevent inadvertent erasure of pre-recorded information and to selectively permit recording of new sound information over previous sound information.

It is a first object of the present invention to provide an electronic business card that is small and thin yet capable of recording, storing and playing back audio information.

It is a further object of the present invention to provide an electronic business card that is inexpensive to manufacture.

It is another object of the present invention to provide an electronic business card having a simple and straightforward two- or three-button operation.

It is yet a further object of the present invention to provide an electronic business card that serves the purpose of a business card while leaving a positive mental impression on the recipient about the goods or services of the provider.

It is a further object still of the present invention to provide an electronic business card that has a long battery life and integrated long-term memory.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 1 is an enlarged front perspective view of an embodiment of the present invention.

FIG. 2 is an enlarged back perspective view of an embodiment of the present invention.

DETAILED DESCRIPTION OF THE PREFERRED AND OTHER EMBODIMENTS

Figure 3:
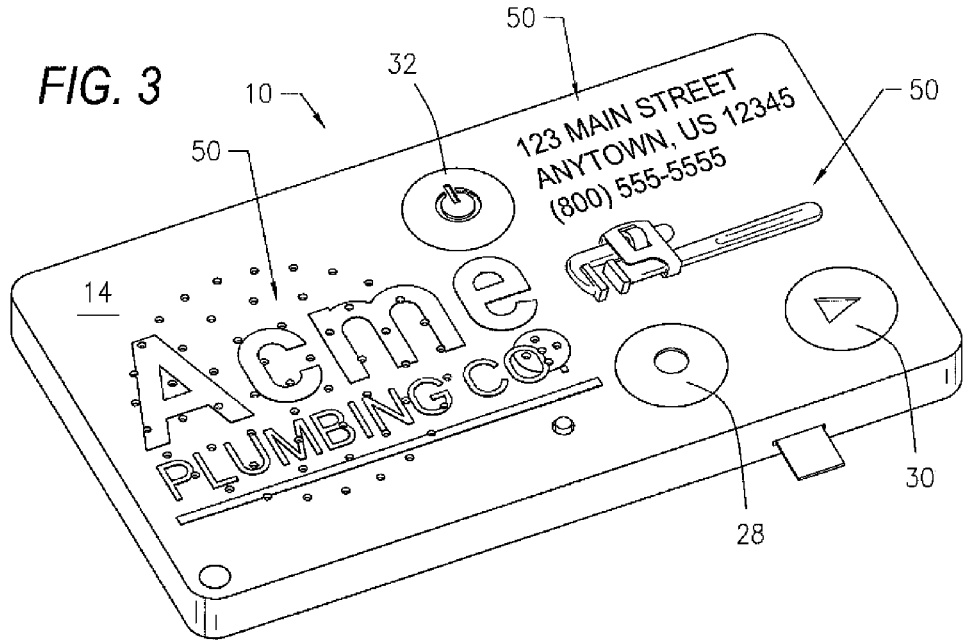
FIGS. 3 and 4 are enlarged perspective views of an alternative embodiment of the present invention.

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

As shown in FIGS. 1 and 2, device 10, roughly the size of a business card, comprises a housing 12 having a top surface 14, a bottom surface 16, and opposite side surfaces 18, 20. Housing 12 is preferably approximately 2.0 inches (50 mm) wide by 3.5 inches (89 mm) long by 0.2 inches (5 mm) thick. By way of reference, a conventional business card is typically in the range of 2.0 inches (50 mm) wide by 3.5 inches (89 mm) long by 0.04 inches (1 mm) thick. Housing 12 may be made of any suitable material, but is preferably lightweight and durable. Exemplary materials include, without limitation, hard foam and layered cardboard die cut.

Figure 4:
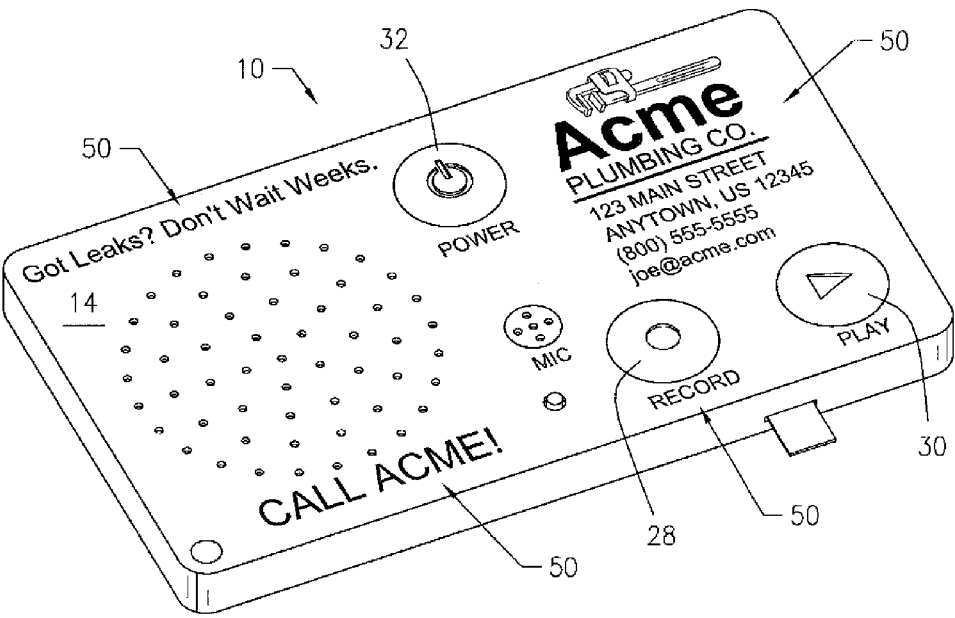

Now referring to FIGS. 3 and 4, top surface 14 of device 10 may be emblazoned with identifying information or indicia 50 such as colors, graphics, company name(s), logo(s), and contact information, as well as personal identifiers such as name(s), address(es) and contact information, or even slogans, graphics, photographs or other visual images. It will be appreciated that top surface 14 is also space that would be available for customizing or personalizing, such as to commemorate or recognize a specific client, user, occasion or event. Similarly, bottom surface 16 of device 10, opposite top surface 14, may also be utilized in the same fashion. Depending on the materials selected and whether they are receptive to printing, stamping, screening or decals, indicia 50 may overlay various structures and components (FIG. 3) or may be strategically placed around them (FIG. 4).

Returning to FIG. 1, sound producing means 22 is integrated into top surface 14 and extends downward into housing 12. Sound producing means 22 is preferably a 32Ω loud speaker measuring approximately 40 mm in diameter. Adjacent sound producing means 22 on top surface 14 are one or more apertures 24 behind which sound recording means 26 is situated. Sound recording means 26 preferably includes an omni-directional electret condenser microphone measuring approximately 6 mm in diameter and approximately 2.7 mm in thickness.

Proximate apertures 24 on top surface 14 of device 10 is record button 28. Proximate record button 28 is play button 30. Also proximate apertures 24 is power button 32. The relative positioning of buttons 28, 30, 32 about top surface 14 is preferably substantially as shown in the drawings, but any orientation is acceptable. As is well known, buttons 28, 30, 32 may be provided with legends or universal pictograms (see, e.g., FIGS. 3 and 4) identifying the respective function(s) of each. Record button 28, play button 30 and power button 32 are preferably pressure-sensitive switches and may share a common size, shape, and contour, and the sensor or sensor pad associated with each within housing 12 (not shown) may be of a common type.

Also proximate record button 28 on top surface 14 of device 10 is a conventional LED indicator 34. Situated along side surface 18 of housing 12 is battery access cover 36. Access cover 36 may be any number of conventional battery access covers, including without limitation hinged covers, frictionally engaged covers, tethered covers, and slide-out battery trays. Not shown in perspective is battery 38, which may be any suitable conventional power source such as a lithium battery (a/k/a lithium-manganese-dioxide or LiMnO$_2$). Persons skilled in the art will appreciate that coin-battery CR2032 is one such exemplary power source, characterized by a long shelf life, posing little health or environmental risk, and capable of performing in relatively low temperatures.

The three-button configuration of device 10 is particularly advantageous because it minimizes the number of controls, ensures simplification of operation, and permits the controls to be as large as practicable for ease of use.

Figure 5:
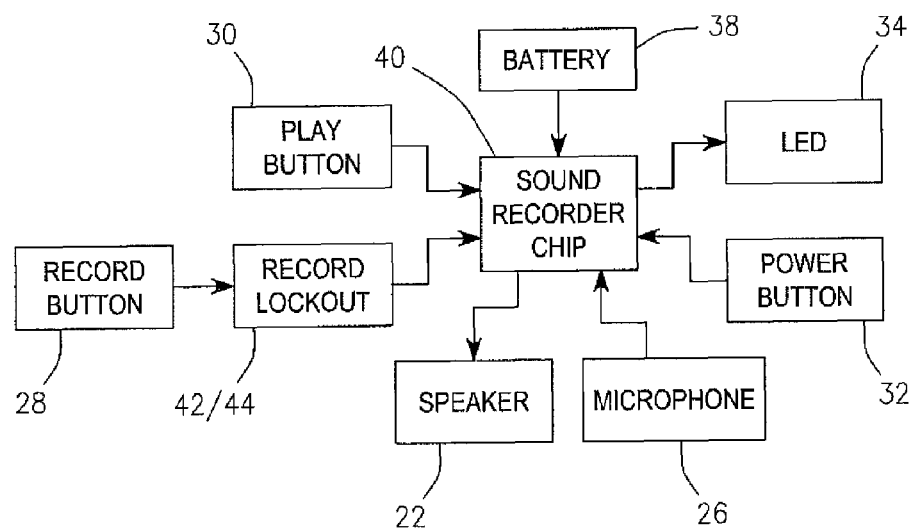
FIG. 5 is a schematic, block diagram depicting various structural and functional relationships of the present invention.

Also considering FIG. 5, in electronic communication with sound producing means 22, sound recording means 26, record button 28, play button 30, power button 32, LED 34 and battery 38 is sound storing means 40. Sound storing means 40 may be any suitable digital sound recording chip, but is preferably a Winbond® ISD1600B series ChipCorder® (WINBOND ELECTRONICS CORP., TAIWAN) and is capable of recording from 6.6 seconds up to 16 minutes of sound information which may be stored in memory for up to 100 years without separate or continuous power. Thus, even if battery 38 or other power source dies or is removed from device 10, the sound information stored as memory in sound storing means 40 will not be lost or corrupted.

LED 34 has two principal functions. First, when continuously illuminated, LED 34 indicates that the record function of sound recording means 26 is active. In other words, a solid LED 34 indicates that sound recording means 26 is in electronic communication with sound storing means 40. Second, when sound storing means 40 is being actuated to play back sound via sound producing means 22, LED 34 will blink. In other words, LED 34 will blink when sound storing means 40 is in electronic communication with sound producing means 22. As stated, LED 34 may be any conventional LED, but LED 34 is preferably integrated with sound storing means 40.

It will be appreciated that the thickness of housing 12 (e.g., the height of opposing side surfaces 18, 20), while preferably in the range of 0.2 inches or 5 mm, may be any value so long as it is sufficiently thick to accommodate sound producing means 22, sound recording means 26, and sound storage means 40, as well as battery 38. The approximate values discussed herein are based on readily available technology; it is anticipated that loud speaker technology will advance to permit thinner devices, and the present disclosure is intended to embrace such developments.

Power button 32 is preferably a pressure-sensitive switch that delivers power from battery 38 to the various electronics of device 10 only while depressed and held. In other words, sound storing means 40 and other components draw zero power when power button 32 is released. It should be appreciated that this will prevent inadvertent or premature power drain should a user fail to turn the power off. Because of the relatively short duration of recording and/or playback of the disclosed device, requiring power button 32 to remain depressed is neither impractical nor unduly inconvenient. Alternatively, power button 32 may be any suitable, conventional power or toggle switch such as magnetic, leaf or slide switches. The power-saving feature may also comprise a timed-off or an auto-off function, both of which are generally known in the art, whereby power delivery is terminated when device 10 is inactive for a period of time.

Figure 6:
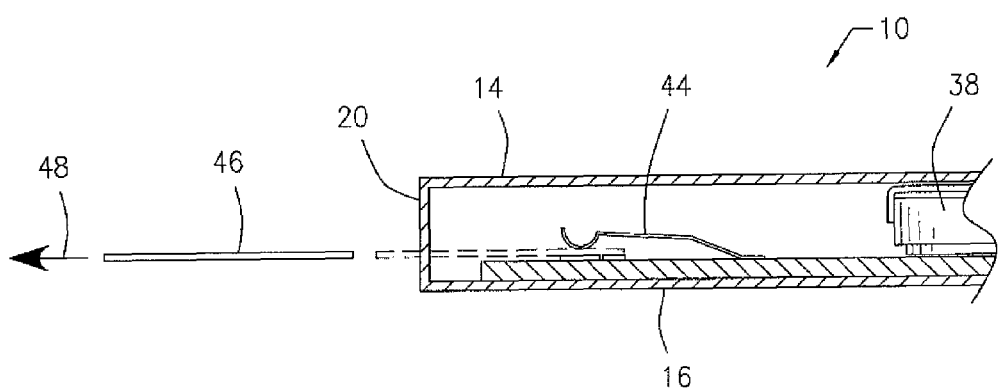
FIG. 6 is a partial cross-section view of an embodiment of the present invention, taken along plane 6'-6' of FIG. 1.
Figure 7:
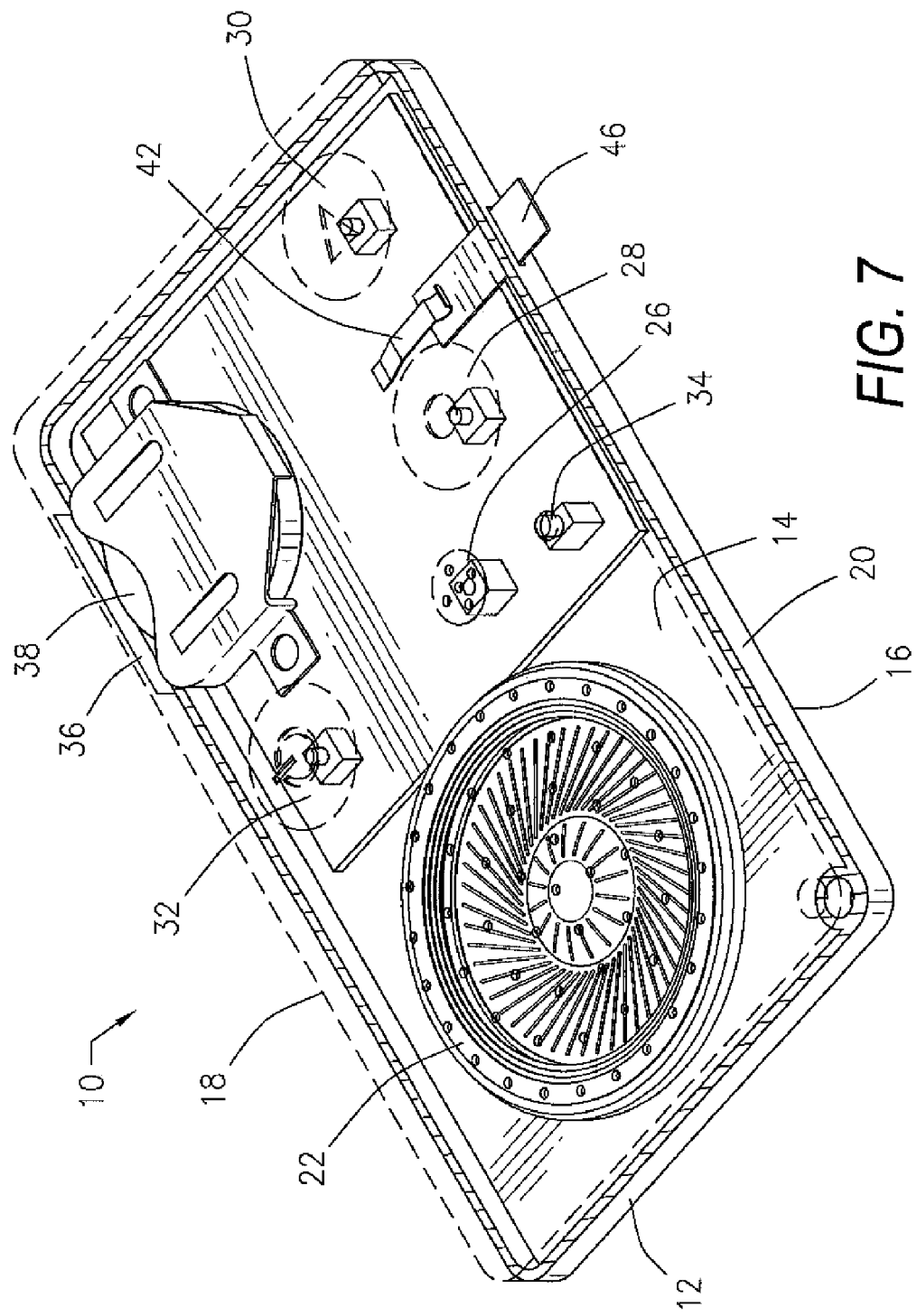
FIG. 7 is an enlarged, partial cutaway view of an embodiment of the present invention.

With respect to FIGS. 5 and 6, device 10 may also feature a record lockout means 42 operably connected to and/or in electronic communication with both record button 28 and sound storing means 40. Referring back to FIG. 2, lockout means 42 is provided at second side 20 of, and extends into, housing 12. Lockout means 42 may be any type of slider, pull-out tab or other structure that, when activated, prevents user input at record button 28 from reaching sound storing means 40. In a preferred embodiment shown in FIG. 6, lockout means 42 comprises a leaf switch 44 in series between record button 28 and sound storing means 40. When tab 46 is in place (not shown), leaf switch 44 is open (i.e., lockout activated) and record button 28 may not communicate electronically with sound storing means 40. Once tab 46 is removed by pulling in the direction of arrow 48 away from leaf switch 44 (FIG. 6), leaf switch 44 is closed, and record button 28 may be in electronic communication with sound storing means 40. Preferably, tab 46 may be re-inserted into leaf switch 44 by sliding in the direction opposite of arrow 48, thereby opening leaf switch 44 and re-activating the record lockout 42.

In operation, power button 32 is depressed and held. In order to play recorded information content stored in sound storing means 40 (the playback function), while power button 28 is held, the user may press and release play button 30, at which time the recorded (or pre-recorded) content stored in sound storing means 40 will be delivered by sound producing means 22. LED 34 will blink during the playback function.

While power button 32 is held, and ensuring that lockout means 42 is deactivated (e.g., by pulling tab 46 in the direction of arrow 48 and out of leaf switch 44), the user may make a new recording (the record function) by pressing and holding record button 28, and speaking into or otherwise capturing ambient sound information via sound recording means 26. The record function will continue until either one or both power of power button 32 and/or record button 28 is released, or until the self-contained memory of sound storing means 40 is full. During the record function, LED 34 will remain continuously illuminated. Any content previously recorded and stored in sound storing means 40 will be deleted upon initiation of the record function.

Thus, the present invention has been described in an illustrative manner. It is to be understood that the terminology that has been used is intended to be in the nature of words of description rather than of limitation. Furthermore, whereas the present invention has been described in relation to the drawings attached hereto, it should be understood that other and further modifications, apart from those shown or suggested herein, may be made within the spirit and scope of this invention.

What is claimed is:

1. An electronic business and information card comprising:
   a housing, wherein at least a portion of said housing is adapted for placement of one or more indicia;
   a sound recording means disposed within said housing;
   a sound storage means disposed within said housing and in electronic communication with said sound recording means;
   a sound producing means disposed within said housing and in electronic communication with said sound storage means;
   a first pressure sensitive switch integral with a top surface of said housing for controlling said sound recording means and said sound storage means, whereby said sound recording means and said sound storage means electronically communicate only when said first switch is depressed;
   a second pressure sensitive switch integral with said top surface for controlling said sound producing means, whereby said sound producing means and said sound storage means electronically communicate only when said second switch is depressed;
   a battery removably secured within said housing; and
   a third pressure sensitive switch integral with said top surface for selectively providing power from said battery whereby power is provided only when said third switch is depressed.

2. The electronic business card of claim 1 wherein said housing measures approximately 2 inches in width by approximately 3.5 inches in length by approximately 0.2 inches in thickness.

3. The electronic business card of claim 1 wherein said sound recording means is a directional condenser microphone.

4. The electronic business card of claim 1 wherein said sound storage means is a sound recorder chip further comprising an LED indicator.

5. The electronic business card of claim 1 wherein said sound producing means is a 32Ω loudspeaker.

6. The electronic business card of claim 1 wherein said indicia are selected from the group consisting of names, logos, slogans, graphics, contact information, and photographs.

7. The electronic business card of claim 1 further comprising a lockout means operably connected to said sound recording means and said sound storage means.

8. The electronic business card of claim 7 wherein said lockout means is selectively actuated.

9. The electronic business card of claim 8 wherein when said lockout means is actuated, electronic communication between said sound recording means and said sound storage means is deactivated.

10. The electronic business card of claim 1 wherein said sound recording means and said sound storage means electronically communicate only while said first switch is depressed and held.

11. The electronic business card of claim 1 wherein power is provided from said battery only while said third switch is depressed and held.

12. An electronic business and information card comprising:
   a housing measuring approximately 2 inches in width by approximately 3.5 inches in length by approximately 0.2 inches in thickness; a portion of said housing being adapted for placement of one or more indicia;
   a directional condenser microphone disposed within said housing;
   a sound recorder chip disposed within said housing and in electronic communication with said sound recording means, said chip further comprising an LED indicator;
   a 32Ω loudspeaker disposed within said housing and in electronic communication with said sound storage means;
   a first pressure sensitive switch integral with a top surface of said housing for controlling said sound recording means and said sound storage means, whereby said sound recording means and said sound storage means electronically communicate only while said first switch is depressed and held;
   a second pressure sensitive switch integral with said top surface for controlling said sound producing means, whereby said sound producing means and said sound storage means electronically communicate only when said second switch is depressed;
   a battery removably secured within said housing;
   a third pressure sensitive switch integral with said top surface for selectively providing power from said battery whereby power is provided only while said third switch is depressed and held; and
   a selectively actuated lockout means operably connected to said sound recording means and said sound storage means, wherein when said lockout means is actuated, electronic communication between said sound recording means and said sound storage means is deactivated.

* * * * *